US011820680B2

United States Patent
Kang et al.

(10) Patent No.: US 11,820,680 B2
(45) Date of Patent: Nov. 21, 2023

(54) ENERGY-SAVING ION ADSORPTION/DESORPTION WATER PURIFICATION APPARATUS AND ENERGY-SAVING WATER PURIFICATION METHOD

(71) Applicant: SIONTECH CO., LTD., Daejeon (KR)

(72) Inventors: Kyung Seok Kang, Daejeon (KR); Kyu Hong Lee, Daejeon (KR); Ho Il Lee, Daejeon (KR); Bo Hyung Ryoo, Daejeon (KR); Nam Soo Park, Daejeon (KR); Kyung Han Lee, Daejeon (KR)

(73) Assignee: SIONTECH CO., LTD., Daejeon (KR)

( * ) Notice: Subject to any disclaimer, the term of this patent is extended or adjusted under 35 U.S.C. 154(b) by 224 days.

(21) Appl. No.: 17/186,985

(22) Filed: Feb. 26, 2021

(65) Prior Publication Data
US 2022/0119288 A1 Apr. 21, 2022

(30) Foreign Application Priority Data
Oct. 15, 2020 (KR) .................. 10-2020-0133472

(51) Int. Cl.
*C02F 1/461* (2023.01)

(52) U.S. Cl.
CPC .. *C02F 1/46109* (2013.01); *C02F 2201/4611* (2013.01); *C02F 2201/4612* (2013.01); *C02F 2201/4616* (2013.01)

(58) Field of Classification Search
CPC ........... C02F 1/4691–4693; C02F 2001/46152
See application file for complete search history.

(56) References Cited

U.S. PATENT DOCUMENTS

| 2011/0240474 A1* | 10/2011 | Seed | C02F 1/4691 |
| | | | 204/660 |
| 2013/0342028 A1* | 12/2013 | Hermann | C02F 1/46104 |
| | | | 307/109 |
| 2018/0037479 A1* | 2/2018 | Servida | C02F 1/4693 |
| 2019/0308893 A1* | 10/2019 | Choi | C02F 1/4691 |
| 2020/0024158 A1* | 1/2020 | Boehme | C02F 1/463 |

FOREIGN PATENT DOCUMENTS

| KR | 10-2006-0130521 A | 12/2006 | |
| KR | 10-2012-0129086 A | 11/2012 | |
| KR | 10-1598589 B1 * | 2/2016 | ............. C02F 1/469 |

* cited by examiner

*Primary Examiner* — Luan V Van
*Assistant Examiner* — Andrew Koltonow
(74) *Attorney, Agent, or Firm* — NKL LAW; Jae Youn Kim

(57) ABSTRACT

The present disclosure provides an energy-saving technology using switching of current of an electrode terminal, which is applied to a capacitive deionization (CDI) water purification apparatus, and control of switching of the current. The water purification apparatus includes a case 110 having an inlet 113 formed in one side thereof and an outlet 115 formed in the opposite side thereof, a plurality of electrode plates 120 accommodated in the case and stacked on one another, and an electrode terminal 130 selectively and electrically connected to the plurality of electrode plates and configured to allow direct current to flow therethrough.

8 Claims, 11 Drawing Sheets

ENERGY-SAVING ION ADSORPTION/DESORPTION WATER PURIFICATION APPARATUS AND ENERGY-SAVING WATER PURIFICATION METHOD

CROSS-REFERENCES TO RELATED APPLICATIONS

This application claims priority to and the benefit of Korean Patent Application No. 10-2020-0133472, filed on Oct. 15, 2020, the disclosure of which is incorporated herein by reference in its entirety.

BACKGROUND OF THE INVENTION

Field of the Invention

The present invention relates to an energy-saving technology using switching of current of an electrode terminal, which is applied to a capacitive deionization (CDI) water purification apparatus, and control of switching of the current.

Description of the Related Art

Patent Document 001 discloses a continuous crystallizer and a method of recrystallizing potassium hydroxide using the same. Specifically, the continuous crystallizer includes a rectangular pipe-type continuous crystallization container, which has an open top and a round bottom and into and from which a mother liquor, in which a compound to be crystallized is dissolved, flows continuously in the longitudinal direction thereof, disc-type cooling plates, into and from which a cooling medium flows to cool the mother liquor, and propellers, each of which has a plurality of rotary blades and is connected to a rotary shaft so as to be rotated. The rotary shaft passes through the center portions of the cooling plates. Each of the cooling plates has a space portion, which is formed under the portion through which the rotary shaft passes in order to allow the mother liquor to flow therethrough. The cooling plates and the propellers are alternately arranged in the continuous crystallization container. When potassium hydroxide is purified by recrystallization using the continuous crystallizer of the present invention, heat exchange of cooling water is efficiently performed, thereby reducing energy consumption and enabling the continuous flow of mother liquor while preventing partial stagnation of the mother liquor.

Patent Document 002 discloses a continuous drowning-out crystallization separation method, which uses a Couette-Taylor reactor, which is a small-capacity reactor, and is capable of saving energy and improving productivity by changing the concentration, residence time and mixing speed of a raw material solution and the sizes of inner and outer cylinders in order to uniformly purify the raw material solution. The separation method includes a first process of selecting a solute for a continuous crystallization separation process and mixing the solute with a solution using a first agitator, a second process of selecting a solvent suitable for the solute and the solution so that the solute can be effectively purified and stirring the solvent using a second agitator, a third process of introducing the mixture of the solute and the solution into a solution inlet of the Couette-Taylor reactor and introducing the solvent into a solvent inlet of the Couette-Taylor reactor, a fourth process of driving the Couette-Taylor reactor using a DC motor so that fluid flows between an inner cylinder and an outer cylinder and the inner cylinder is rotated to generate a Taylor vortex in the axial direction thereof, a fifth process of checking crystallization of the two materials using the samples thereof, which have been introduced into multiple sampling entrances formed in the upper portion of the Couette-Taylor reactor by the Taylor vortex, and a sixth process of discharging the purified and crystallized material to the outside of the Couette-Taylor reactor through a drain hole formed in the Couette-Taylor reactor.

RELATED ART DOCUMENTS

Patent Documents (Patent Document 001) Korean Patent Laid-Open Publication No. 10-2012-0129086 A (published on Nov. 28, 2012)
(Patent Document 002) Korean Patent Laid-Open Publication No. 10-2006-0130521 A (published on Dec. 19, 2006)

SUMMARY OF THE INVENTION

It is an object of the present invention to provide an energy-saving technology using switching of current of an electrode terminal, which is applied to a capacitive deionization (CDI) water purification apparatus, and control of switching of the current.

In accordance with an aspect of the present invention, the above and other objects can be accomplished by the provision of an energy-saving ion adsorption/desorption water purification apparatus 100 including a case 110 having an inlet 113 formed in one side thereof and an outlet 115 formed in the opposite side thereof, a plurality of electrode plates 120 accommodated in the case, the plurality of electrode plates being stacked on one another, and an electrode terminal 130 selectively and electrically connected to the plurality of electrode plates, the electrode terminal being configured to allow direct current to flow therethrough.

The plurality of electrode plates may be formed in a toroidal shape.

The energy-saving ion adsorption/desorption water purification apparatus 100 may further include a first flow space 141 communicating with the inlet, the first flow space being formed around the outer circumferential surfaces of the plurality of electrode plates, a second flow space 142 formed between neighboring ones of the plurality of electrode plates, and a third flow space 143 formed in the center portions of the plurality of electrode plates, the third flow space communicating with the outlet.

The energy-saving ion adsorption/desorption water purification apparatus 100 may further include a first spacer 151 located in the first flow space, the first spacer being disposed in the longitudinal direction of the case, and a second spacer 152 located in the second flow space.

The case may include a body 111 having two open opposite end portions, a first cover 112 coupled to one end portion of the body, the first cover having the inlet 113 at a center portion thereof, and a second cover 114 coupled to the other end portion of the body, the second cover having the outlet 115 at a center portion thereof.

The energy-saving ion adsorption/desorption water purification apparatus 100 may further include a first sealing member 161, located between the body and the first cover, and a second sealing member 162, located between the body and the second cover.

The case may be provided in a plurality thereof, and the plurality of cases may be coupled to each other in series. The energy-saving ion adsorption/desorption water purification apparatus 100 may further include a coupling unit 171, configured to integrally couple the plurality of cases to each other, and a connection tube 172, configured to connect the outlet of one case to the inlet of another case mounted adjacent thereto.

The energy-saving ion adsorption/desorption water purification apparatus 100 may further include a raw water supply pipe 210 communicating with the inlet to supply raw water to the inlet, a main discharge pipe 220 communicating with the outlet to discharge water flowing out of the outlet, a sub-discharge pipe 230 branched from the main discharge pipe, a first valve 240 mounted to the raw water supply pipe, and a second valve 250 mounted between the main discharge pipe and the sub-discharge pipe.

The energy-saving ion adsorption/desorption water purification apparatus 100 may further include a power supply unit 300 configured to supply current to the electrode terminal.

In accordance with another aspect of the present invention, there is provided an energy-saving water purification method including an operation step S100 of operating the water purification apparatus described above, a first measurement step S200 of measuring an input concentration and an output concentration during the operation step, a second measurement step S300 of measuring the cycle at which the polarities of current are changed and the cycle at which on/off states of switches are changed by a controller during the operation step, an analysis step S400 of analyzing data after the first measurement step and the second measurement step, and a determination step S500 of determining operation efficiency after the analysis step. The above steps may be performed sequentially over time.

In accordance with a further aspect of the present invention, there is provided an energy-saving water purification method including an operation step S100 of operating the water purification apparatus described above, a first measurement step S200 of measuring an input concentration and an output concentration during the operation step, a second measurement step S300 of measuring the cycle at which the polarities of current are changed and the cycle at which on/off states of switches are changed by a controller during the operation step, an analysis step S400 of analyzing data after the first measurement step and the second measurement step, a program generation step S610 of generating a modification program by confirming an optimum operation condition after the analysis step, and an uploading step S620 of storing the modification program in the controller after the program generation step. The above steps may be performed sequentially over time.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
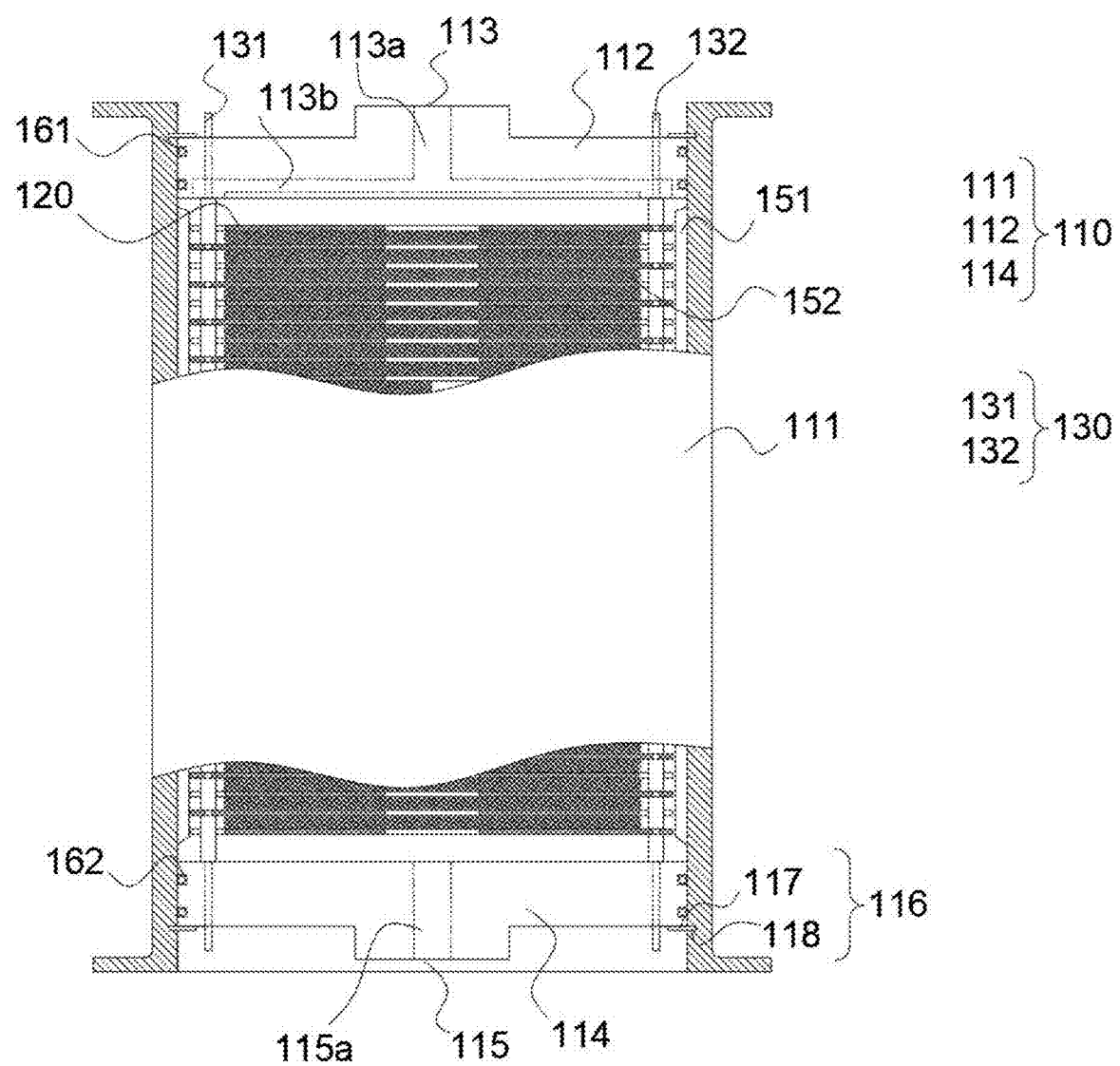
FIG. 1 is a cross-sectional view of a water purification apparatus according to the present invention.

Hereinafter, embodiments of the present invention will be described in detail with reference to the accompanying drawings so that those skilled in the art to which the present invention pertains may easily carry out the embodiments. The present invention may, however, be embodied in many different forms, and should not be construed as being limited to the embodiments set forth herein.

In the drawings, the same or similar elements are denoted by the same reference numerals even when they are depicted in different drawings. Further, examples set forth in this specification and the configuration illustrated in the drawings are only a most preferred embodiment, and do not represent all the technical ideas of the present invention. Therefore, at the time of filing of the present application, it will be understood that there are various equivalents that may be substituted therefor. Superordinate terms used in the embodiments include subordinate terms not mentioned herein.

(Embodiment 1-1) An energy-saving ion adsorption/desorption water purification apparatus 100 includes a case 110, which has an inlet 113 formed in one side thereof and an outlet 115 formed in the opposite side thereof, a plurality of electrode plates 120, which are accommodated in the case and stacked on one another, and an electrode terminal 130, which is selectively and electrically connected to the electrode plates and through which direct current flows.

(Embodiment 1-2) In embodiment 1-1 of the energy-saving ion adsorption/desorption water purification apparatus according to the present invention, the case is made of an insulating material.

(Embodiment 1-3) In embodiment 1-2 of the energy-saving ion adsorption/desorption water purification apparatus according to the present invention, the case is made of plastic.

(Embodiment 1-4) In embodiment 1-1 of the energy-saving ion adsorption/desorption water purification apparatus according to the present invention, the case has a rectangular-shaped or circular-shaped cross-section.

(Embodiment 1-5) In embodiment 1-1 of the energy-saving ion adsorption/desorption water purification apparatus according to the present invention, the electrode terminal is two in number, and direct currents having opposite polarities are applied to the respective electrode terminals.

The present invention (refer to embodiments 1-1 to 1-5 and FIG. 1) relates to a water purification apparatus that adsorbs and desorbs chlorine contained in water. The apparatus is mainly composed of a case, electrode plates, and electrode terminals. The case is formed so as to allow water to continuously flow therethrough. The water flows between the electrode plates. Direct currents having opposite polarities, i.e. a negative polarity and a positive polarity, are applied to the respective electrode plates. Ions in water are separated by the currents, and the separated ions are adsorbed to the electrode plates.

Water is purified by the adsorption, and the purified water is discharged to the outside of the case. When the polarities applied to the respective electrode plates are switched, the adsorbed ions are separated from the electrode plates, whereby waste water is discharged.

That is, the electrode plates are arranged with a regular interval therebetween, and adsorption and desorption of ions are repeatedly performed by switching the current applied to the electrode plates. The process of purifying water is performed through adsorption of ions, and the process of discharging waste water is performed through desorption of ions.

(Embodiment 2-1) In embodiment 1-1 of the energy-saving ion adsorption/desorption water purification apparatus according to the present invention, the electrode plates are formed in a toroidal shape.

(Embodiment 2-2) In embodiment 2-1 of the energy-saving ion adsorption/desorption water purification apparatus according to the present invention, the electrode plates are formed so as to realize capacitive deionization (CDI).

(Embodiment 2-3) In embodiment 2-1 of the energy-saving ion adsorption/desorption water purification apparatus according to the present invention, the electrode plates are formed in a polygonal shape.

(Embodiment 2-4) In embodiment 2-1 of the energy-saving ion adsorption/desorption water purification apparatus according to the present invention, each of the electrode plates has a monopolar configuration in which adsorbing materials having the same polarity are formed on the two opposite surfaces thereof.

(Embodiment 2-5) In embodiment 2-1 of the energy-saving ion adsorption/desorption water purification apparatus according to the present invention, each of the electrode plates has a bipolar configuration in which adsorbing materials having opposite polarities are respectively formed on the two opposite surfaces thereof.

(Embodiment 2-6) In embodiment 2-1 of the energy-saving ion adsorption/desorption water purification apparatus according to the present invention, each of the toroidal-shaped electrode plates includes an electrode engagement portion 121, which is formed in a hole shape at a point of the edge thereof, and an electrode avoidance portion 122, which is formed in a slot shape at a point of the edge thereof so as to be opposite the electrode engagement portion 121 in the center line of the electrode plate.

Figure 2A:
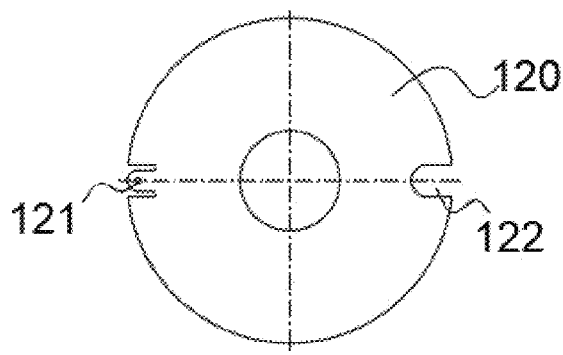
FIGS. 2A-2C are views of electrode plates of the water purification apparatus according to the present invention.
Figure 2B:
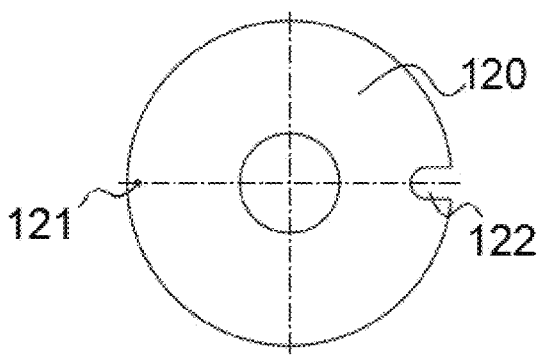
Figure 2C:
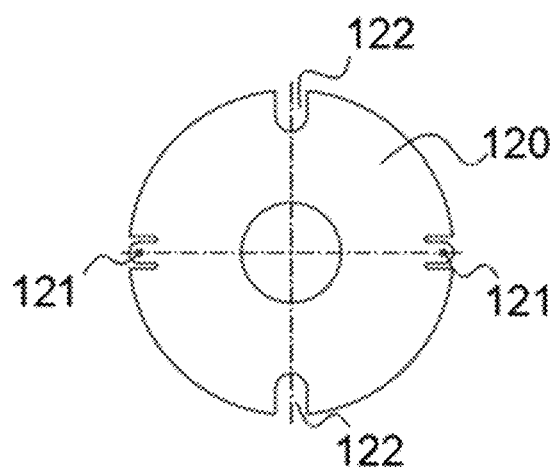

The present invention (refer to embodiments 2-1 to 2-6 and FIGS. 2A-2C) relates to an electrode plate, to which current is applied and which separates ions from water.

It is preferable that the electrode plate be formed in a toroidal shape. Water flows from the outer circumference of the toroidal-shaped electrode plate to the center portion thereof, and is discharged through a hole formed in the center portion thereof. Alternatively, the electrode plate may be formed in a polygonal shape. In this case, the electrode plate may be formed in any one of rectangular, hexagonal, and octagonal shapes.

It is preferable that the electrode plate be made of a graphite material through which current is capable of flowing. Ion-adsorbing materials, which selectively adsorb ions, may be attached to the two opposite surfaces of the electrode plate, and membranes, which selectively filter ions, may be attached to the surfaces of the ion-adsorbing materials.

The electrode plate may have a monopolar configuration or a bipolar configuration depending on the polarities of the adsorbing materials attached thereto. That is, when adsorbing materials having the same polarity are attached to the two opposite surfaces thereof, the electrode plate has a monopolar configuration, and when adsorbing materials having opposite polarities are respectively attached to the two opposite surfaces thereof, the electrode plate has a bipolar configuration.

In order to apply power to the electrode plate, two electrode terminals may be engaged with the electrode plate. In order to realize engagement with one of the two electrode terminals, the electrode plate includes an electrode engagement portion formed at a point of the edge thereof. In addition, in order to avoid engagement with the other one of the two electrode terminals, the electrode plate includes an electrode avoidance portion formed at the opposite point of the edge thereof.

Each of the electrode engagement portion and the electrode avoidance portion may be formed in a plural number in order to more effectively apply power to the electrode plate.

(Embodiment 3-1) Embodiment 1-1 of the energy-saving ion adsorption/desorption water purification apparatus according to the present invention includes a first flow space 141, which communicates with the inlet and is formed around the outer circumferential surfaces of the electrode plates, a second flow space 142, which is formed between neighboring electrode plates, and a third flow space 143, which is formed in the center portions of the toroidal-shaped electrode plates and communicates with the outlet.

(Embodiment 4-1) Embodiment 1-1 of the energy-saving ion adsorption/desorption water purification apparatus according to the present invention includes a first spacer 151, which is located in the first flow space and is disposed in the longitudinal direction of the case, and a second spacer 152, which is located in the second flow space.

(Embodiment 4-2) In embodiment 4-1 of the energy-saving ion adsorption/desorption water purification apparatus according to the present invention, the second spacer is formed in a mesh shape.

(Embodiment 4-3) In embodiment 4-1 of the energy-saving ion adsorption/desorption water purification apparatus according to the present invention, the second spacer is made of a nonwoven fabric.

(Embodiment 4-4) In embodiment 4-1 of the energy-saving ion adsorption/desorption water purification apparatus according to the present invention, the first spacer and the second spacer are made of an insulating material.

(Embodiment 4-5) In embodiment 4-1 of the energy-saving ion adsorption/desorption water purification apparatus according to the present invention, the second spacer is formed in a disc shape.

(Embodiment 4-6) In embodiment 4-1 of the energy-saving ion adsorption/desorption water purification apparatus according to the present invention, the first spacer is provided in a plural number, and the plurality of first spacers is arranged with a regular interval therebetween along the inner side wall of the case.

(Embodiment 4-7) In embodiment 4-6 of the energy-saving ion adsorption/desorption water purification apparatus according to the present invention, the plurality of first spacers is attached to the inner side wall of the case.

(Embodiment 4-8) In embodiment 4-6 of the energy-saving ion adsorption/desorption water purification apparatus according to the present invention, the plurality of first spacers is inserted between the inner side wall of the case and the electrode plates.

Figure 3:
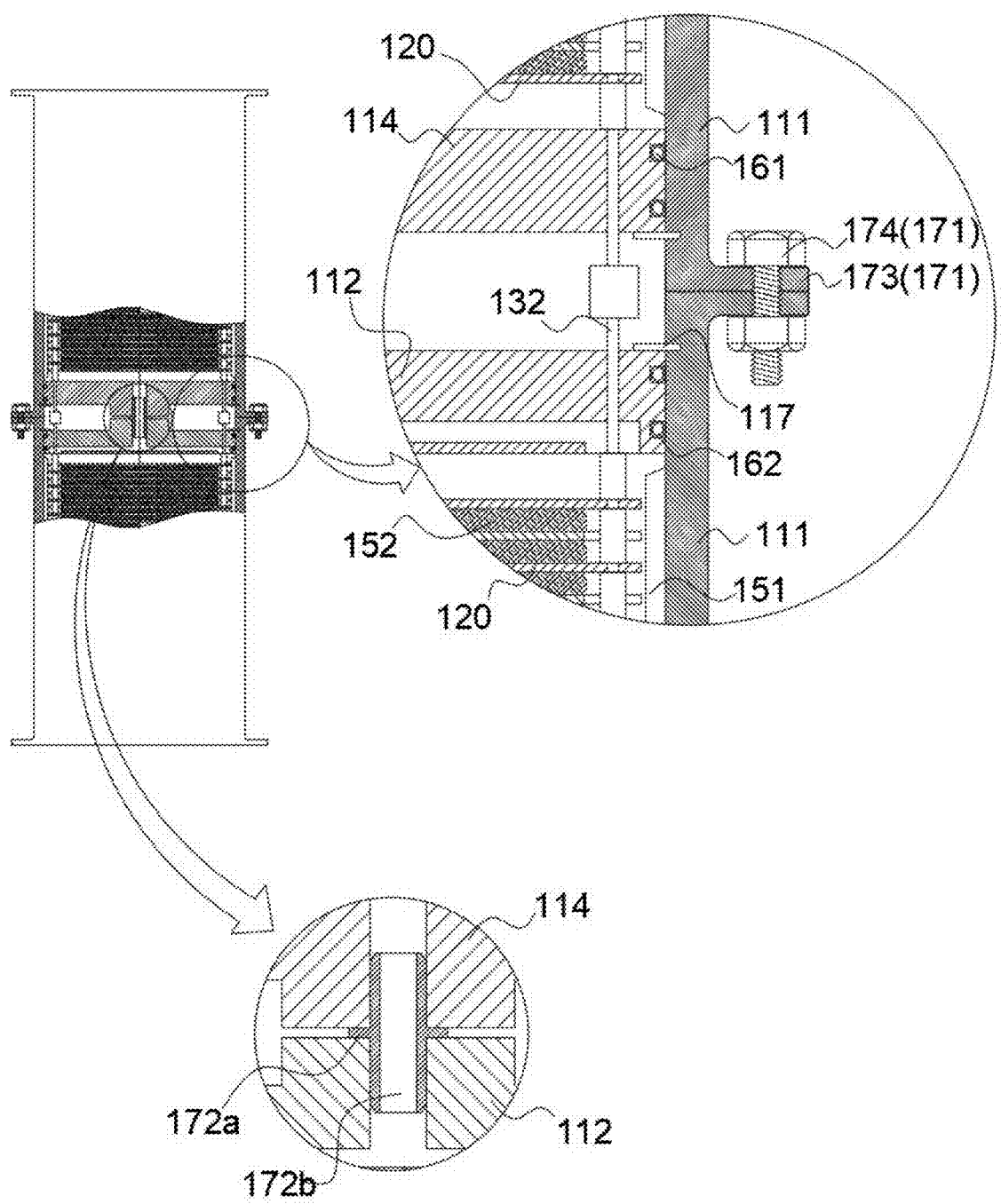
FIG. 3 is a cross-sectional view of the water purification apparatus according to the present invention in which a plurality of cases is coupled to each other in series.

The present invention (refer to embodiments 3-1, 4-1 to 4-8 and FIGS. 1 and 3) relates to flow spaces and spacers. Water introduced into the case primarily flows through the first flow space formed along the inner side wall of the case, the water located on the inner side wall of the case secondarily flows through the second flow space formed between the electrode plates, and the water located between the electrode plates tertiarily flows through the third flow space formed in the holes in the center portions of the electrode plates.

Separation of ions from the water occurs in the second flow space. Purified water and waste water alternately flow through the third flow space. The first flow space needs to be formed uniformly between the outer circumferential surfaces of the electrode plates and the inner side wall of the case. To this end, the plurality of first spacers is located in the first flow space. The plurality of first spacers is formed in the shape of a bar, one surface of which is in contact with the outer circumferential surfaces of the electrode plates and the opposite surface of which is attached to the inner side wall of the case. Accordingly, the first flow space may be formed in a uniform cylindrical shape.

The second spacer is located between one electrode plate and another electrode plate adjacent thereto. In the case in which a plurality of electrode plates is stacked on one another with a predetermined gap therebetween, the second spacer serves to make the gap uniform. In order to allow water to flow therethrough, the second spacer is preferably formed in a mesh shape. For example, the second spacer may be made of a porous nonwoven fabric.

(Embodiment 5-1) In embodiment 1-1 of the energy-saving ion adsorption/desorption water purification apparatus according to the present invention, the case includes a body 111, which has two open opposite end portions, a first cover 112, which is coupled to one end portion of the body and has the inlet 113 at the center portion thereof, and a second cover 114, which is coupled to the other end portion of the body and has the outlet 115 at the center portion thereof.

(Embodiment 5-2) In embodiment 5-1 of the energy-saving ion adsorption/desorption water purification apparatus according to the present invention, the inlet includes a first entrance hole 113$a$, which is formed in the center portion of the first cover and has one end exposed from one surface of the first cover and an opposite end located in the middle of the first cover, and a second entrance hole 113$b$, which has one end communicating with the opposite end of the first entrance hole and an opposite end exposed from the opposite surface of the first cover.

(Embodiment 5-3) In embodiment 5-1 of the energy-saving ion adsorption/desorption water purification apparatus according to the present invention, the outlet includes a first discharge hole 115$a$ penetrating the center portion of the second cover.

(Embodiment 5-4) In embodiment 5-1 of the energy-saving ion adsorption/desorption water purification apparatus according to the present invention, each of the first cover and the second cover includes a fastening unit 116 so as to be selectively coupled to the body.

(Embodiment 5-5) In embodiment 5-4 of the energy-saving ion adsorption/desorption water purification apparatus according to the present invention, the fastening unit includes a plurality of bolts.

(Embodiment 5-6) In embodiment 5-4 of the energy-saving ion adsorption/desorption water purification apparatus according to the present invention, the fastening unit includes a fitting recess, formed in the body, and a fitting protrusion, formed at each of the first and second covers so as to be fitted into the fitting recess.

(Embodiment 5-7) In embodiment 5-4 of the energy-saving ion adsorption/desorption water purification apparatus according to the present invention, the fastening unit includes first screw threads, provided at the body, and second screw threads, provided at each of the first and second covers so as to be engaged with the first screw threads.

(Embodiment 5-8) In embodiment 5-4 of the energy-saving ion adsorption/desorption water purification apparatus according to the present invention, the fastening unit includes a plurality of coupling panels 117 and a plurality of coupling recesses 118 formed in the body. The coupling panels 117 are respectively fitted into the coupling recesses 118, and support the outer surfaces of the first and second covers.

The present invention (refer to embodiments 5-1 to 5-8 and FIGS. 1 and 3) relates to a case. The case of the present invention includes a cylindrical body, and further includes a first cover and a second cover, which respectively cover the two opposite ends of the body. The body and the first and second covers may be integrally formed with each other, or may be provided separately from each other. The first cover has the inlet into which water is introduced, and the second cover has the outlet from which water is discharged. Raw water to be purified is introduced into the inlet, and purified water and waste water are alternately discharged through the outlet.

In order to facilitate the introduction of water into the first flow space, a main flow passage is formed in the center portion of the first cover, and a plurality of branch flow passages extends from the main flow passage in a radial direction. Specifically, a single first entrance hole is formed from the center of one surface of the first cover to the middle of the first cover, and a plurality of second entrance holes extends in the radial direction from the first entrance hole to the opposite surface of the first cover. The first entrance hole and the second entrance holes are formed inside the first cover.

The first cover and the second cover need to be securely coupled to the body so as not to be separated from the body. To this end, the components constituting the fastening unit are provided at the inner circumferential surface of the body and the outer circumferential surface of each of the first and second covers. The first and second covers may be coupled to the body in a bolt engagement manner or an interference-fitting manner by the fastening unit. Alternatively, the first and second covers may be coupled to the body using separate coupling panels.

(Embodiment 6-1) Embodiment 1-5 of the energy-saving ion adsorption/desorption water purification apparatus according to the present invention includes a first sealing member 161, which is located between the body and the first cover, and a second sealing member 162, which is located between the body and the second cover.

(Embodiment 6-2) In embodiment 6-1 of the energy-saving ion adsorption/desorption water purification apparatus according to the present invention, the first sealing member is provided in a plural number.

(Embodiment 6-3) In embodiment 6-1 of the energy-saving ion adsorption/desorption water purification apparatus according to the present invention, each of the first sealing member and the second sealing member is implemented as an O-ring 163.

The present invention (refer to embodiments 6-1 to 6-3 and FIG. 3) relates to a sealing member. A sealed space is formed in the case by the body and the first and second covers, and water flows through the sealed space. Therefore, the body and the covers need to have a structure that prevents water from leaking to the outside.

In order to realize this structure, a sealing member is provided. The sealing member may be provided in a plural number, and each of the plurality of sealing members may be implemented as an O-ring. O-ring insertion grooves are formed in the outer circumferential surfaces of the first and second covers, which come into contact with the body, in order to allow the O-rings to be inserted thereinto. The O-rings may be made of rubber materials having the same hardness or different hardnesses, and may be formed in the same shape or different shapes. The reason for this is to form multiple airtight films to thus ensure watertightness.

(Embodiment 7-1) In embodiment 1-1 of the energy-saving ion adsorption/desorption water purification apparatus according to the present invention, the case is provided in a plural number, and the plurality of cases is coupled to each other in series. The present embodiment includes a coupling unit 171 configured to integrally couple the cases to each other and a connection tube 172 configured to connect an outlet of one case to an inlet of another case mounted adjacent thereto.

(Embodiment 7-2) In embodiment 7-1 of the energy-saving ion adsorption/desorption water purification apparatus according to the present invention, the coupling unit includes a flange 173, which is formed at the outer surface of an end portion of each of the cases, and a coupling bolt 174, which is engaged with the flanges of neighboring cases, which are in contact with each other, in order to fasten the flanges.

(Embodiment 7-3) In embodiment 7-1 of the energy-saving ion adsorption/desorption water purification apparatus according to the present invention, the coupling unit includes a connection protrusion 175, which is formed at the outer surface of one end portion of the case, and a coupling clip 176, which is formed at the outer surface of the other end portion of the case so as to be engaged with the connection protrusion 175.

(Embodiment 7-4) In embodiment 7-1 of the energy-saving ion adsorption/desorption water purification apparatus according to the present invention, the coupling unit includes a plurality of fastening holes 177, which are formed in the outer wall of the case, and a plurality of long bolts 178, which are inserted into the fastening holes in order to integrally couple the plurality of cases to each other.

(Embodiment 7-5) In embodiment 7-1 of the energy-saving ion adsorption/desorption water purification apparatus according to the present invention, the connection tube is made of a flexible material.

(Embodiment 7-6) In embodiment 7-5 of the energy-saving ion adsorption/desorption water purification apparatus according to the present invention, the flexible material is synthetic rubber.

(Embodiment 7-7) In embodiment 7-1 of the energy-saving ion adsorption/desorption water purification apparatus according to the present invention, the connection tube includes a tubular-shaped body and a plate-shaped compression portion 172a protruding from the middle portion of the tubular-shaped body.

(Embodiment 7-8) In embodiment 7-1 of the energy-saving ion adsorption/desorption water purification apparatus according to the present invention, the connection tube includes a tubular-shaped insertion portion 172b and a plurality of airtight protrusions 172c protruding from the outer circumferential surface of the insertion portion.

The present invention (refer to embodiments 7-1 to 7-8 and FIG. 3) relates to a structure for coupling a plurality of cases to each other. The plurality of cases of the present invention may have a structure for being coupled to each other in series and/or a structure for being coupled to each other in parallel. As a structure for coupling in series, the cases are coupled to each other using flanges formed on the outer circumferential surfaces of the cylindrical bodies thereof. As another embodiment, the cases may be coupled to each other using clamps. As still another embodiment, the cases may be coupled to each other by fastening a long bolt into the cases so as to penetrate the same. In the case in which two cases are coupled to each other, an outlet of one case needs to be connected to an inlet of the other case. In order to prevent leakage of water through the connected portion between the outlet of one case and the inlet of the other case, a connection tube is inserted into the outlet and the inlet. The connection tube includes a tubular-shaped body and a plate-shaped compression portion protruding from the middle portion of the tubular-shaped body. Alternatively, the connection tube includes a tubular-shaped insertion portion and a plurality of airtight protrusions protruding from the outer circumferential surface of the insertion portion. Accordingly, it is possible to ensure watertightness.

(Embodiment 8-1) Embodiment 1-1 of the energy-saving ion adsorption/desorption water purification apparatus according to the present invention includes a raw water supply pipe 210, which communicates with the inlet to supply raw water to the inlet, a main discharge pipe 220, which communicates with the outlet to discharge water flowing out of the outlet, a sub-discharge pipe 230, which is branched from the main discharge pipe, a first valve 240, which is mounted to the raw water supply pipe, and a second valve 250, which is mounted between the main discharge pipe and the sub-discharge pipe.

(Embodiment 8-2) Embodiment 8-1 of the energy-saving ion adsorption/desorption water purification apparatus according to the present invention includes a first concentration detection sensor 261, which is mounted to the raw water supply pipe, and a second concentration detection sensor 262, which is mounted to the main discharge pipe.

Figure 4:
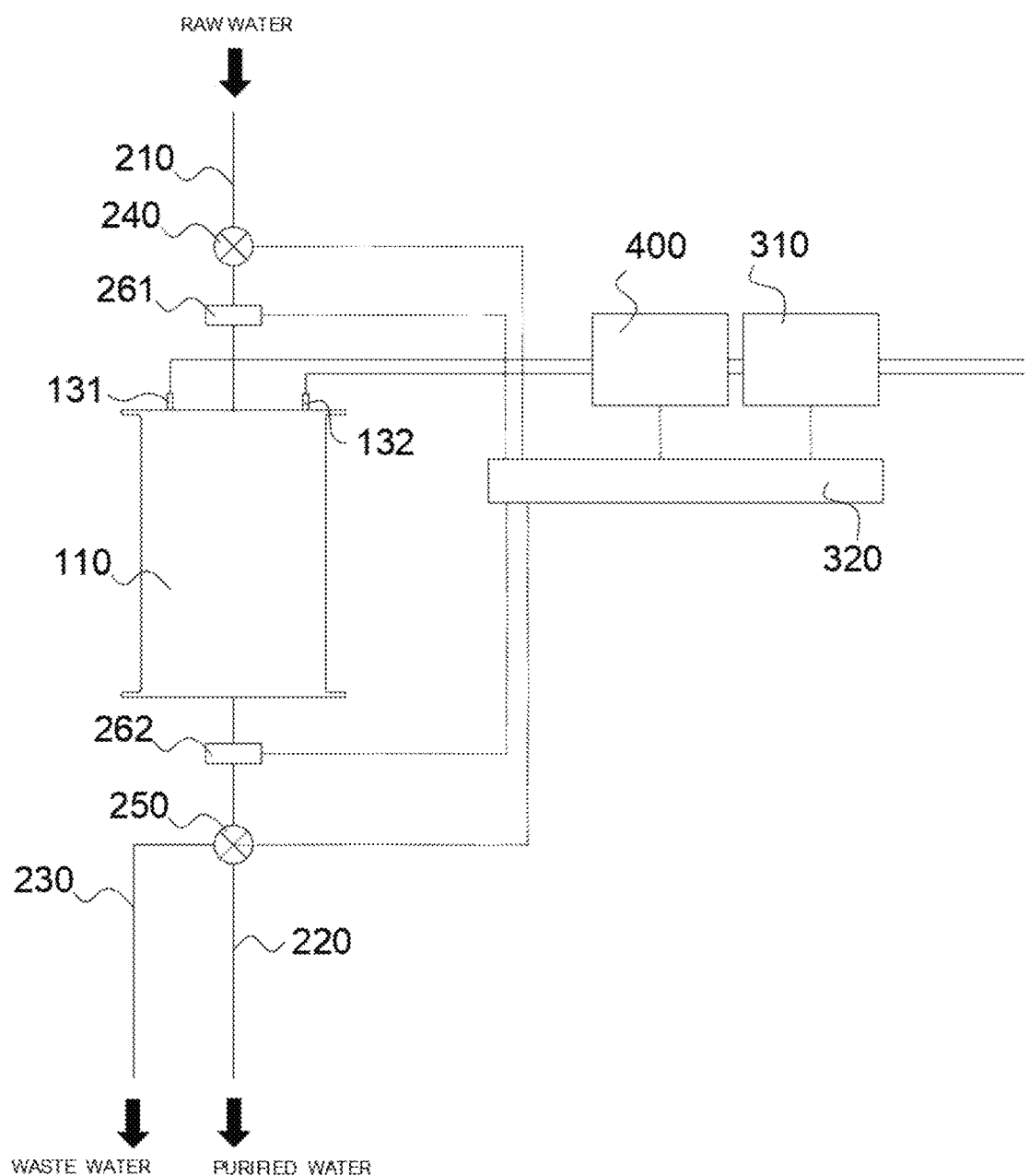
FIG. 4 is a diagram showing the engagement of the water purification apparatus according to the present invention and a control device.
Figure 5:
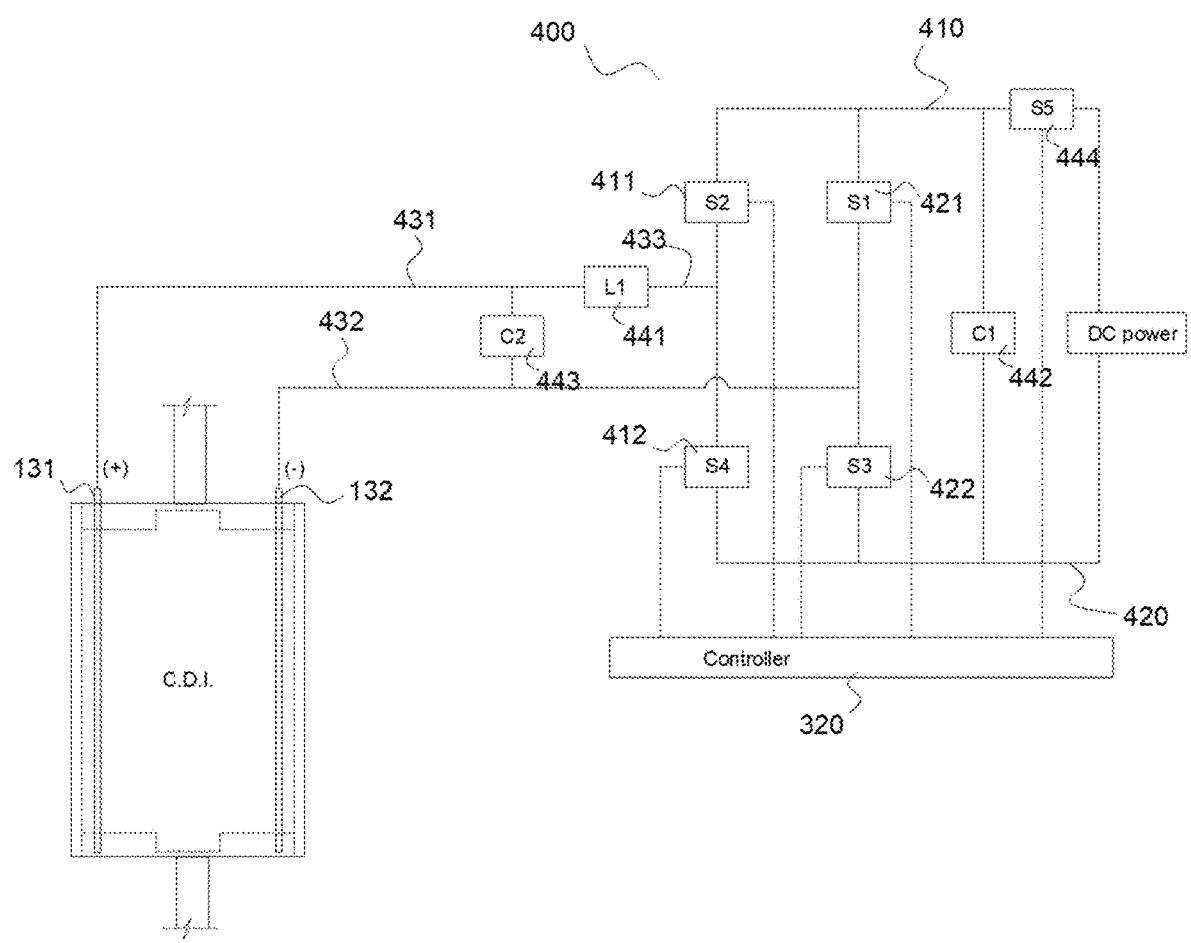
FIG. 5 is a system diagram of a power supply unit according to the present invention.
Figure 6:
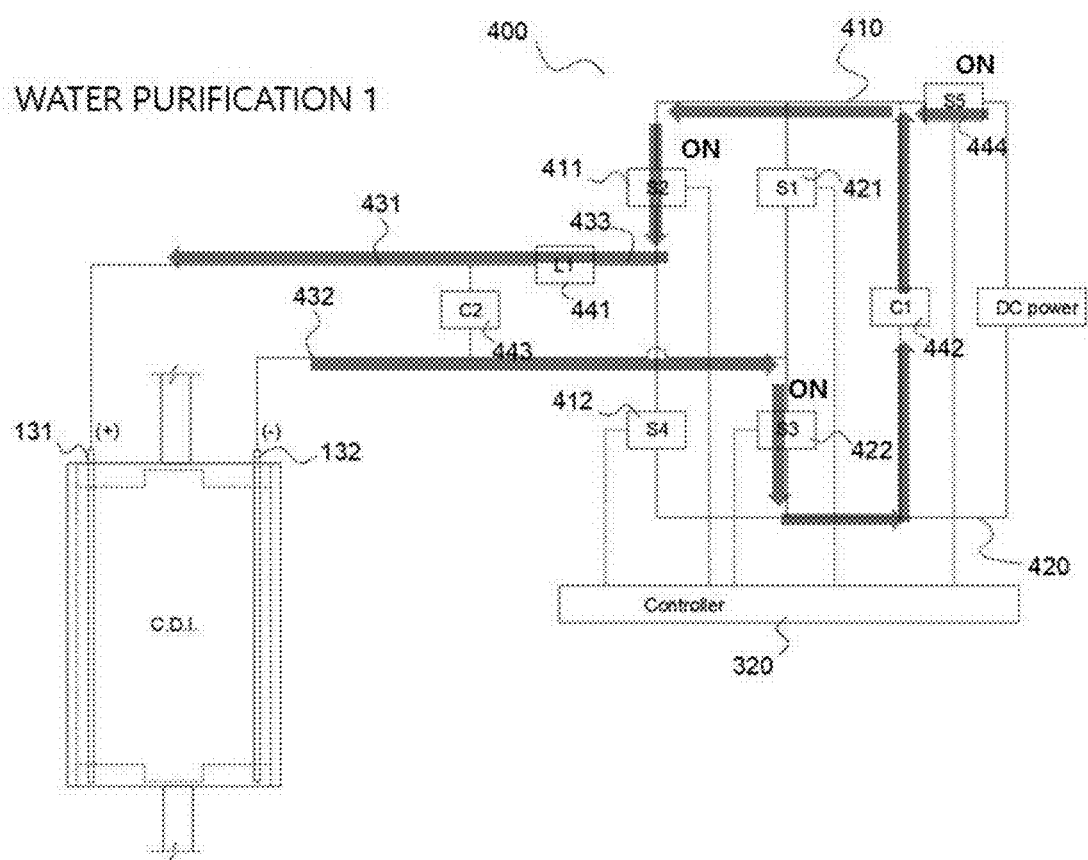
FIGS. 6 and 7 are system diagrams showing on/off operation of switches during a water purification process of the water purification apparatus according to the present invention.
Figure 7:
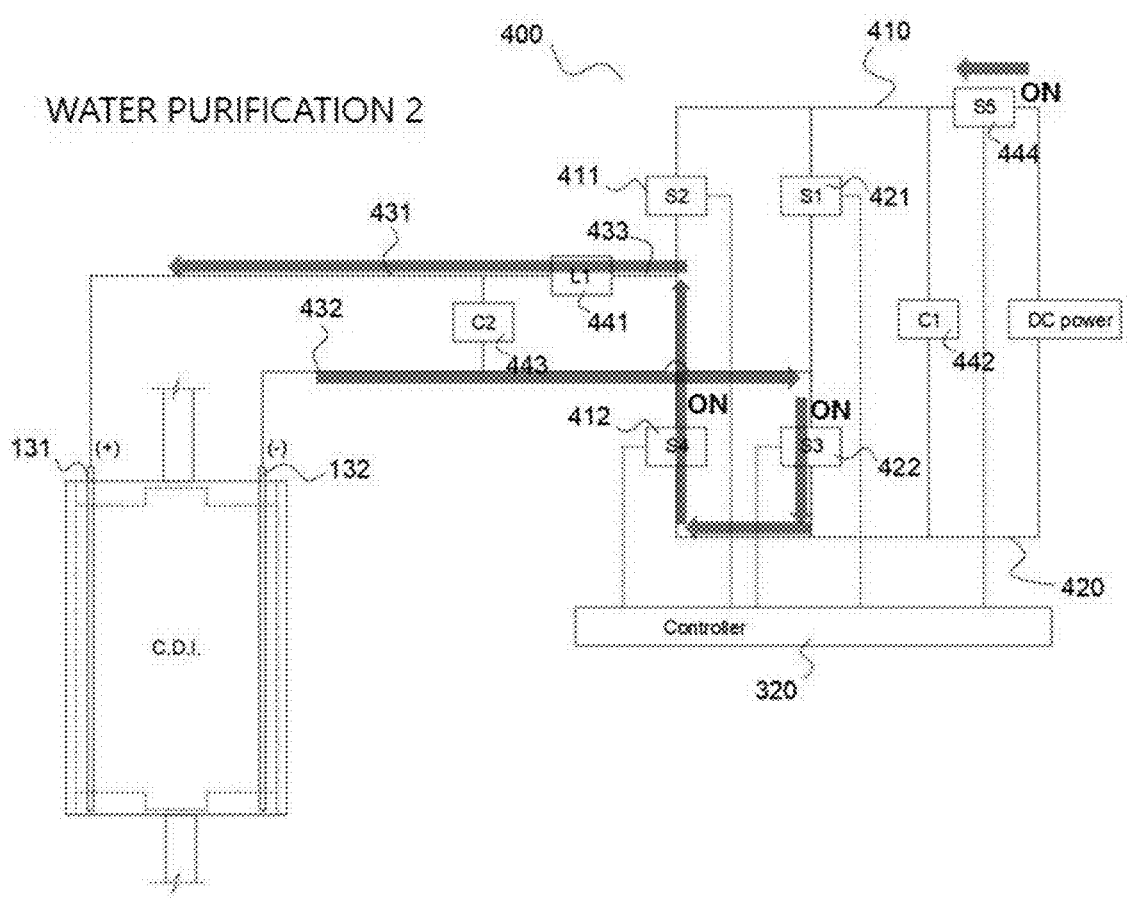
Figure 8:
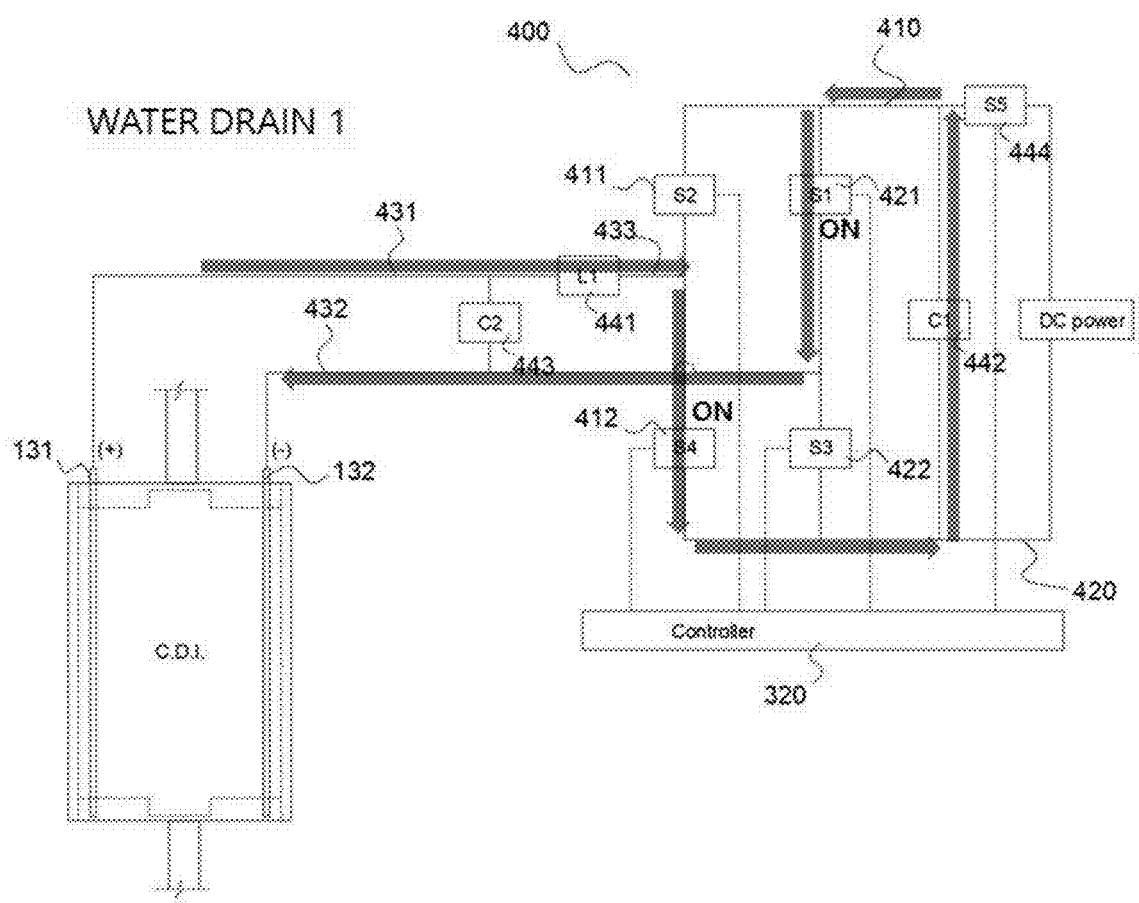
FIGS. 8 and 9 are system diagrams showing on/off operation of switches during a water drain process of the water purification apparatus according to the present invention.
Figure 9:
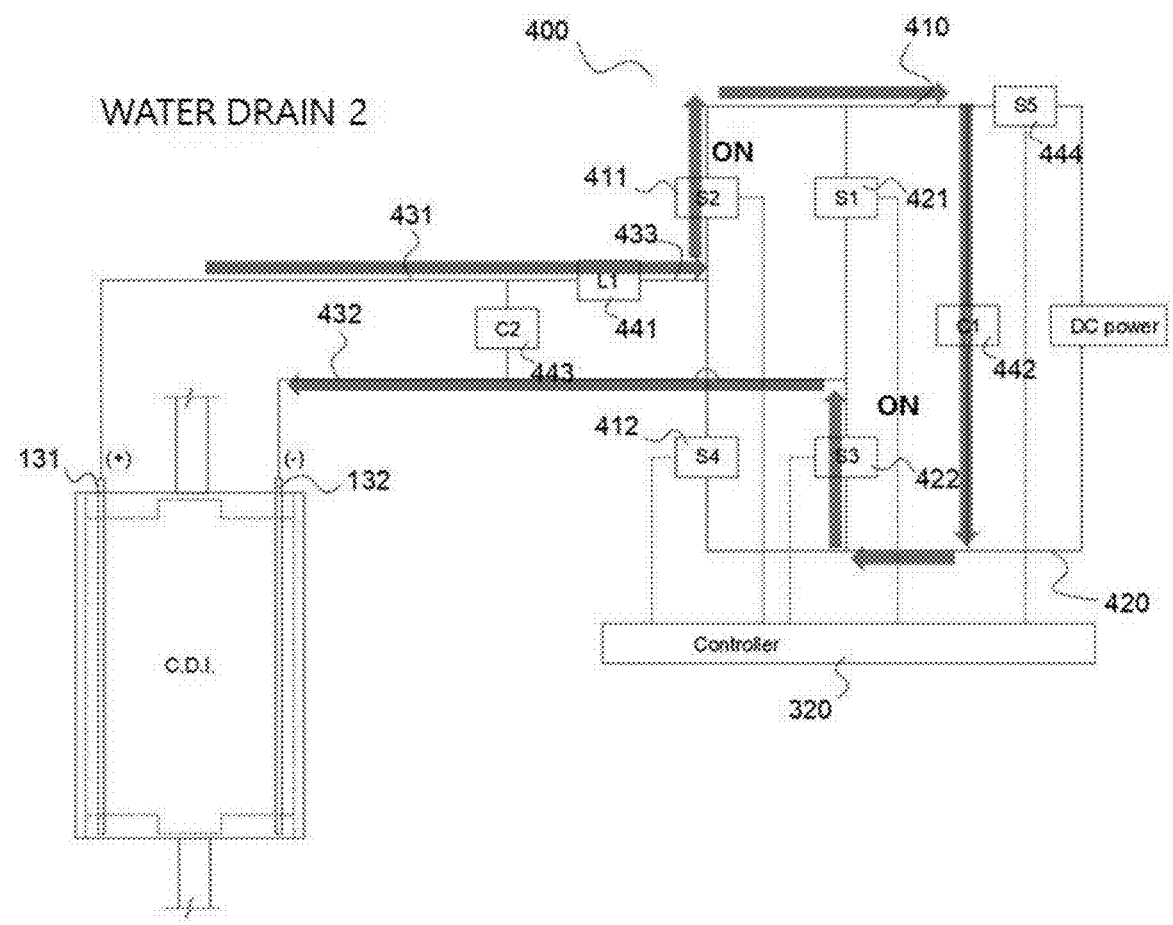

The present invention (refer to embodiments 8-1 and 8-2 and FIGS. 4 and 5) relates to pipes mounted outside the case. A raw water supply pipe is connected to the inlet in order to supply raw water to the inlet, and a main discharge pipe is connected to the outlet in order to discharge purified water and waste water flowing out of the outlet.

Purified water and waste water are selectively generated by switching the polarity of the current applied to the electrode plates, as described above. In order to sort purified water and waste water, a sub-discharge pipe is connected to the main discharge pipe, and a second valve is mounted between the main discharge pipe and the sub-discharge pipe. Purified water is discharged to the main discharge pipe. When waste water is generated due to switching of the polarity of the current applied to the electrode plates, the second valve is operated to induce the waste water to be discharged to the sub-discharge pipe.

In addition, a first valve is mounted to the raw water supply pipe. Because it is required that a constant amount of water flow through the raw water supply pipe at all times, the operation of the first valve is very limited. For example, the first valve is used only during maintenance of the apparatus or replacement of parts of the apparatus. Concentration detection sensors are mounted to the raw water supply pipe and the main discharge pipe in order to measure the concentration of constituent elements in water, and the operation of the water purification apparatus is controlled based on the result of the measurement. In particular, it is preferable to control the timing of switching of the polarity of the current and the magnitude of the voltage applied to the apparatus.

(Embodiment 9-1) Embodiment 1-1 of the energy-saving ion adsorption/desorption water purification apparatus according to the present invention includes a power supply unit 300 configured to supply current to the electrode terminals.

(Embodiment 9-2) Embodiment 9-1 of the energy-saving ion adsorption/desorption water purification apparatus according to the present invention includes a DC power source 310, which is provided at the power supply unit and converts alternating current into direct current, a converter 400, which is mounted between the DC power source and the electrode terminals and changes the amount of current supply and the supply direction, and a controller 320, which controls the converter. The electrode terminals include a first electrode terminal 131, to which current having a positive polarity is supplied, and a second electrode terminal 132, to which current having a negative polarity is supplied.

(Embodiment 9-3) In embodiment 9-2 of the energy-saving ion adsorption/desorption water purification apparatus according to the present invention, the converter forms a buck-converter circuit structure and a boost-converter circuit structure. The converter includes a fifth switch 444, which connects a power terminal 410 of the converter to the DC power source, a reference power terminal 420 of the DC power source and the converter, a first connection line 431, which is connected to the first electrode terminal, a second connection line 432, which is connected to the second electrode terminal, an inductor 441, which is provided on the first connection line, a third connection line 433, which is connected to the inductor 441, a first switch 421, which is connected to the power terminal 410 and the second connection line 432, a second switch 411, which is connected to the power terminal 410 and the third connection line 433, a third switch 422, which is connected to the reference power terminal 420 and the second connection line 432, a fourth switch 412, which is connected to the reference power terminal 420 and the third connection line 433, a first capacitor 442, which is connected to the power terminal 410 and the reference power terminal 420, and a second capacitor 443, which is connected to the first connection line and the second connection line.

(Embodiment 9-4) In embodiment 9-3 of the energy-saving ion adsorption/desorption water purification apparatus according to the present invention, the water purification operation is performed using the operating principle of a buck converter. The water purification operation includes a first circuit connection step (S111) of turning on the second switch and the third switch and turning off the first switch and the fourth switch in the state in which the fifth switch is turned on, a second circuit connection step (S112) of turning on the second switch and the third switch and turning on the first switch and the fourth switch, and a switch-alternating step (S110) of, by the controller, repeatedly alternating the first circuit connection step and the second circuit connection step at a predetermined cycle.

(Embodiment 9-5) In embodiment 9-4 of the energy-saving ion adsorption/desorption water purification apparatus according to the present invention, the controller performs a first voltage measurement step (S121) of measuring the voltage of the third connection line 433, a second voltage measurement step (S122) of measuring the voltage of the first connection line 431, a third voltage measurement step (S123) of measuring the voltage across the two ends of the power terminal 410, and a first control step (S120) of controlling the switch-alternating step through the first voltage measurement step to the third voltage measurement step.

(Embodiment 9-6) In embodiment 9-3 of the energy-saving ion adsorption/desorption water purification apparatus according to the present invention, the water purification operation is performed using the operating principle of a boost converter. The water purification operation includes a discharging step (S121) of turning on the first switch and the fourth switch and turning off the second switch and the third switch in the state in which the fifth switch is turned off, a charging step (S122) of turning on the second switch and the third switch and turning off the first switch and the fourth switch, and a current-supply-alternating step (S120) of, by the controller, repeatedly alternating the discharging step and the charging step at a predetermined cycle.

The present invention (refer to embodiments 9-1 to 9-6 and FIGS. 5 to 9) relates to a power supply unit.

Using the energy stored in the CDI apparatus in the form of ions, it is possible effectively desorb ions stored in the CDI apparatus during the water purification operation without the use of external energy. The discharging step is a process of discharging the energy stored in the CDI apparatus and the first capacitor 442, and the charging step is a process of again storing the energy stored in the inductor 441 during the discharging step in the first capacitor 442. In the CDI apparatus, (ion) charges move to the reference power terminal 420 during the discharging step, and move to the power terminal 410 during the charging step. That is, desorption of ions occurs in both steps.

In the water purification process, direct currents having the same polarity are applied to the two electrode terminals (i.e. the first and second electrode terminals). However, the polarities of the direct currents applied to the electrode terminals are repeatedly switched by the converter.

The second switch and the third switch are turned on at the same time, whereas the first switch and the fourth switch are turned off. At this time, the current having a positive polarity that has passed through the second switch flows to the first electrode terminal via the inductor and is supplied to the CDI apparatus. Thereafter, the third switch and the fourth switch are turned on, and the first switch and the second switch are turned off. At this time, the current stored in the inductor is supplied to the CDI apparatus.

Since the current stored in the inductor is used for the CDI apparatus through the on/off operation of the switches, it is possible to obtain an effect of saving energy. That is, it is possible to further reduce the amount of current supply compared to the case where there is no converter.

On the other hand, in the case of a water drain process, the first switch and the fourth switch are turned on, and the second switch and the third switch are turned off. At this time, a discharge current may be generated in the CDI apparatus through the inductor. After a certain period of time elapses, the on/off states of the switches are changed. The second switch and the third switch are turned on, and the first switch and the fourth switch are turned off. At this time, the energy stored in the inductor moves, and the cycle at which the on/off states of the switches are changed is adjusted, thereby determining the discharge current. It is possible to obtain an effect of storing the current of the inductor in the first capacitor in the process of changing the on/off states of the switches.

Therefore, due to the change in the on/off states of the switches by the converter, the water purification process is performed using the direct current supplied from the DC power source, whereas the water drain process is performed without the supply of external current. That is, since the water drain process does not need external current, it is possible to save energy. The change in the on/off states of the switches during the water purification process and the water drain process is performed by the controller.

(Embodiment 10-1) The present invention relates to an energy-saving water purification method. Specifically, an energy-saving water purification method includes an operation step (S100) of operating the water purification apparatus of embodiment 1-1, a first measurement step (S200) of measuring an input concentration and an output concentration during the operation step, a second measurement step (S300) of measuring the cycle at which the polarities of current are changed and the cycle at which the on/off states of the switches are changed by the controller during the operation step, an analysis step (S400) of analyzing data after the first measurement step and the second measurement step, and a determination step (S500) of determining operation efficiency after the analysis step. The above steps are performed sequentially over time.

(Embodiment 11-1) The present invention relates to an energy-saving water purification method. Specifically, an energy-saving water purification method includes an operation step (S100) of operating the water purification apparatus of embodiment 1-1, a first measurement step (S200) of measuring an input concentration and an output concentration during the operation step, a second measurement step (S300) of measuring the cycle at which the polarities of current are changed and the cycle at which the on/off states of the switches are changed by the controller during the operation step, an analysis step (S400) of analyzing data after the first measurement step and the second measurement step, a program generation step (S610) of generating a modification program by confirming an optimum operation condition after the analysis step, and an uploading step (S620) of storing the modification program in the controller after the program generation step. The above steps are performed sequentially over time.

Figure 10:
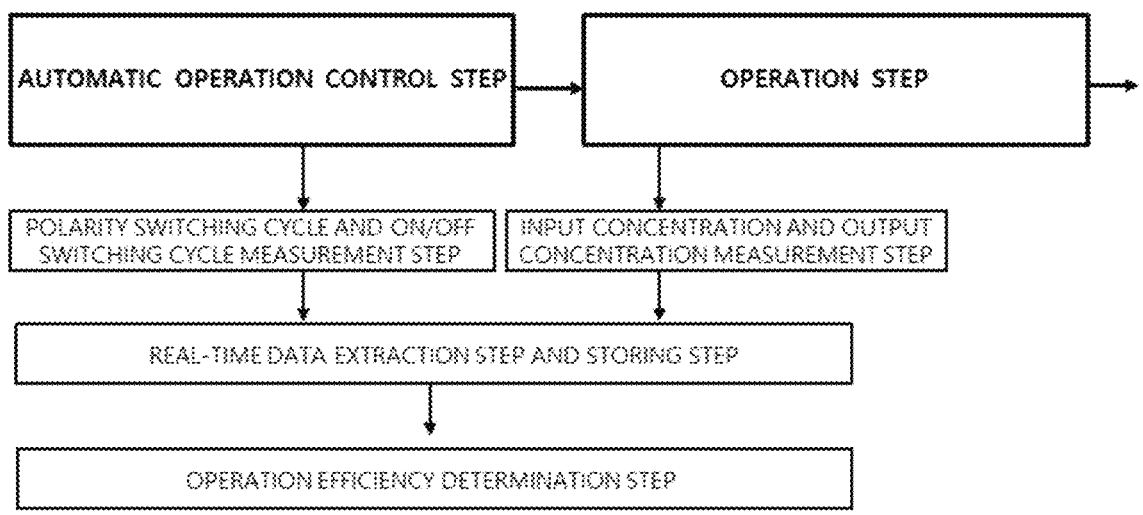
FIGS. 10 and 11 are flowcharts showing operation of the water purification apparatus according to the present invention.

The present invention (refer to embodiment 11-1 and FIG. 10) relates to an energy-saving water purification method. In particular, the present invention has the purpose of determining an effect depending on the cycle at which the polarities of current are changed and the cycle at which the on/off states of the switches are changed. When the water purification apparatus of embodiment 1 is operated, the above-described steps are performed while varying the cycle at which the polarities of current are changed as a primary variable. In addition, the cycle at which the on/off states of the switches are changed is varied as a secondary variable during the primary variable-processing operation. The water purification efficiency is determined based on the various cycles at which the polarities of current are changed and the various cycles at which the on/off states of the switches are changed, and the determined water purification efficiency may apply to the operation efficiency. The water purification efficiency is determined by comparing the concentration of constituent elements in the raw water and the concentration of constituent elements in the generated purified water with each other. The optimum operation condition is determined by the controller based on the various variables.

Figure 11:
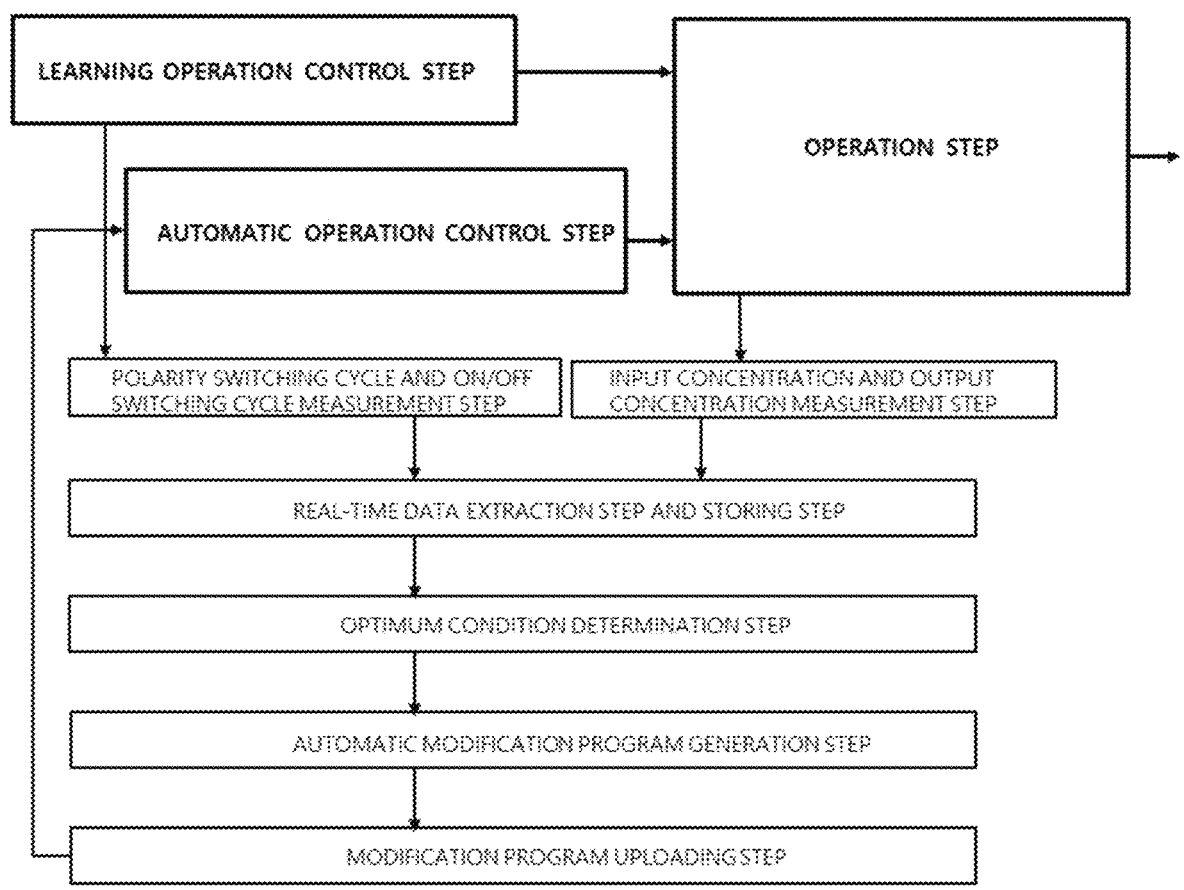

The present invention (refer to embodiment 11-1 and FIG. 11) has the purpose of changing the operating condition of the converter by providing the operating condition (the cycle at which the polarities of current are changed and the cycle at which the on/off states of the switches are changed) for the best effect, obtained as a result of embodiment 10-1 described above, to the controller. Using the result obtained from the analysis step, a new operating condition is set, and the set operating condition is uploaded to the operating program of the controller. This process is performed in real time. In particular, even when the water purification apparatus is operated normally, the concentration of constituent elements in the raw water and the concentration of constituent elements in the purified water are measured in real time, and the controller autonomously performs control in real time so as to exhibit the best efficiency.

As is apparent from the above description, the present invention purifies water by adsorbing and desorbing chlorine contained in the water. According to the present invention, water purification and water drain are alternately performed by switching the polarities of current applied to the electrode plates.

The electrode plates are accommodated in the cylindrical-shaped case, and currents are applied to all of the electrode plates using two electrode terminals. The case of the present invention may be provided in a plural number, and the plurality of cases may be coupled to each other in series or in parallel.

The electrode plates have a toroidal shape, and water is discharged through holes formed in the center portions of the electrode plates. Accordingly, it is possible to secure a flow passage capable of smoothly discharging water in a small space. The first and second spacers serve to make the amount of water flow uniform. Since the first and second covers are removably coupled to the case, it is possible to facilitate assembly and repair of the apparatus.

The water purification apparatus of the present invention is capable of reducing current consumption by switching on/off states of the switches and combining the inductor and the condenser. The water purification apparatus of the present invention autonomously inspects the apparatus, learns the result of inspection, and maintains an optimum operation condition in real time.

In addition, the current switching method of the present invention performs self-discharge using the stored energy during the water drain process. Therefore, compared to a conventional operation method, the speed at which charged ions are desorbed increases, and thus the time required for the water drain process is shortened, thereby increasing a collection rate.

The power supply unit of the present invention effectively controls peak current that is generated at the initial stages of the water purification and water drain processes, thereby stabilizing the supply of current. Accordingly, generation of OH— ions is prevented, and thus pH variation and scale fouling are reduced. Accordingly, it is possible to maintain desalination performance for a long time and to improve the durability of the electrode plates.

In addition, since OH— ions, generated by peak current, are effectively controlled, it is possible to prevent aryl ether cleavage, SN2 benzyl attack, Hoffmann elimination (E2), and nucleophilic substitution at a position of α carbon in the main chain of ion-exchange polymer, thereby increasing the lifespan of an ion-selective material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

100: ion adsorption/desorption water purification apparatus 110: case
111: body 112: first cover
113: inlet 113a: first entrance hole
113b: second entrance hole 114: second cover
115: outlet 115a: first discharge hole
116: fastening unit 117: coupling panel
118: coupling recess 120: electrode plate
122: electrode avoidance portion 130: electrode terminal
131: first electrode terminal 132: second electrode terminal
141: first flow space 142: second flow space
143: third flow space 151: first spacer
152: second spacer 161: first sealing member
162: second sealing member 163: O-ring
171: coupling unit 172: connection tube
172a: compression portion 172b: insertion portion
172c: airtight protrusion 173: flange
174: coupling bolt 175: connection protrusion
176: coupling clip 177: fastening hole
178: long bolt 210: raw water supply pipe
220: main discharge pipe 230: sub-discharge pipe
240: first valve 250: second valve
261: first concentration detection sensor 262: second concentration detection sensor
300: power supply unit 310: DC power source
320: controller 400: converter
410: power terminal 411: second switch
412: fourth switch 420: reference power terminal
421: first switch 422: third switch
431: first connection line 432: second connection line
433: third connection line 441: inductor
442: first capacitor 443: second capacitor
444: fifth switch

The invention claimed is:

1. An energy-saving ion adsorption/desorption water purification apparatus, comprising:
a case having an inlet formed in one side thereof and an outlet formed in an opposite side thereof;
a plurality of electrode plates accommodated in the case, the plurality of electrode plates being stacked on one another;
a first electrode terminal and a second electrode terminal respectively configured to be connected to the plurality of electrode plates, the first electrode terminal and the second electrode terminal being configured to allow a direct current to flow therethrough; and
a power supply unit configured to supply a current to the first electrode terminal and the second electrode terminal;
wherein each electrode plate has an electrode engagement portion formed in a hole shape at a first point of an edge of the electrode plate, and each electrode plate has an electrode avoidance portion formed in a slot shape at a second point of the edge of the electrode plate so as to be opposite the electrode engagement portion so that the current is applied to each electrode plate through the first electrode terminal or the second electrode terminal,
wherein purified water and waste water are selectively generated by switching a polarity of the current applied to the first electrode terminal and the second electrode terminal connected to the electrode plates,
wherein the power supply unit includes a direct current (DC) power source to convert alternating current to the current a converter, which is coupled between the DC power source and the first electrode terminal and the second electrode terminal respectively, to change an amount and direction of the current supplied to the first electrode terminal and the second electrode terminal; and a controller to control the converter to change the amount and direction of the current supplied to the first electrode terminal and the second electrode terminal, and
wherein the converter comprises:
a first connection line, which is connected to the first electrode terminal;
a second connection line, which is connected to the second electrode terminal;
a first switch, which connects a power terminal and the DC power source, which connects a reference power terminal of the DC power source to the converter, and which is connected to the second connection line;
an inductor, which is provided on the first connection line;
a third connection line, which is connected to the inductor on the first connection line;
a second switch, which is connected to the power terminal and the third connection line;
a third switch, which is connected to the reference power terminal and the second connection line;
a fourth switch, which is connected to the reference power terminal and the third connection line;
a first capacitor, which is connected to the power terminal and the reference power terminal; and
a second capacitor, which is connected to the first connection line and the second connection line.

2. The energy-saving ion adsorption/desorption water purification apparatus according to claim 1, wherein the plurality of electrode plates is formed in a toroidal shape.

3. The energy-saving ion adsorption/desorption water purification apparatus according to claim 1, further comprising:
a first flow space communicating with the inlet, the first flow space being formed around outer circumferential surfaces of the plurality of electrode plates;
a second flow space formed between neighboring ones of the plurality of electrode plates; and
a third flow space formed in center portions of the plurality of electrode plates, the third flow space communicating with the outlet.

4. The energy-saving ion adsorption/desorption water purification apparatus according to claim 3, further comprising:
a first spacer located in the first flow space, the first spacer being disposed in a longitudinal direction of the case; and
a second spacer located in the second flow space.

5. The energy-saving ion adsorption/desorption water purification apparatus according to claim 1, wherein the case comprises:
a body having two open opposite end portions;

a first cover coupled to one end portion of the body, the first cover having the inlet at a center portion thereof; and a second cover coupled to the other end portion of the body, the second cover having the outlet at a center portion thereof.

6. The energy-saving ion adsorption/desorption water purification apparatus according to claim 5, further comprising:

a first sealing member located between the body and the first cover; and a second sealing member located between the body and the second cover.

7. The energy-saving ion adsorption/desorption water purification apparatus according to claim 1, wherein the case is provided in a plurality thereof, and the plurality of cases is coupled to each other in series, and wherein the water purification apparatus further comprises:

a coupling unit configured to integrally couple the plurality of cases to each other; and a connection tube configured to connect an outlet of one case to an inlet of another case mounted adjacent thereto.

8. The energy-saving ion adsorption/desorption water purification apparatus according to claim 1, further comprising:

a raw water supply pipe communicating with the inlet to supply raw water to the inlet;

a main discharge pipe communicating with the outlet to discharge water flowing out of the outlet;

a sub-discharge pipe branched from the main discharge pipe;

a first valve mounted to the raw water supply pipe; and a second valve mounted between the main discharge pipe and the sub-discharge pipe.

* * * * *